No. 839,233. PATENTED DEC. 25, 1906.
W. C. TRUSSELL.
HAY LOADER.
APPLICATION FILED FEB. 5, 1906.

2 SHEETS—SHEET 1.

Witnesses:
L. E. Kennedy
E. Batchelder

Inventor
W. C. Trussell
by
Wright Brown Quinby May
Attorneys.

No. 839,233. PATENTED DEC. 25, 1906.
W. C. TRUSSELL.
HAY LOADER.
APPLICATION FILED FEB. 5, 1906.

2 SHEETS—SHEET 2.

Witnesses:
L. E. Kennedy
E. Batchelder

Inventor.
W. C. Trussell
by
Attorneys

UNITED STATES PATENT OFFICE.

WILBERT C. TRUSSELL, OF BOSTON, MASSACHUSETTS, ASSIGNOR, BY DIRECT AND MESNE ASSIGNMENTS, TO TRUSSELL HAY HARVESTING MACHINERY COMPANY, OF BOSTON, MASSACHUSETTS, A CORPORATION OF MASSACHUSETTS.

HAY-LOADER.

No. 839,233.   Specification of Letters Patent.   Patented Dec. 25, 1906.

Application filed February 5, 1906. Serial No. 299,427.

*To all whom it may concern:*

Be it known that I, WILBERT C. TRUSSELL, of Boston, in the county of Suffolk and State of Massachusetts, have invented certain new and useful Improvements in Hay-Loaders, of which the following is a specification.

The object of this invention is to provide a machine of simple construction which can be connected to any ordinary hay-wagon and will be effective to gather up hay from the ground and deposit it in the wagon.

Of the accompanying drawings, forming a part of this specification, there is illustrated the preferred embodiment of the invention.

Figure 1:
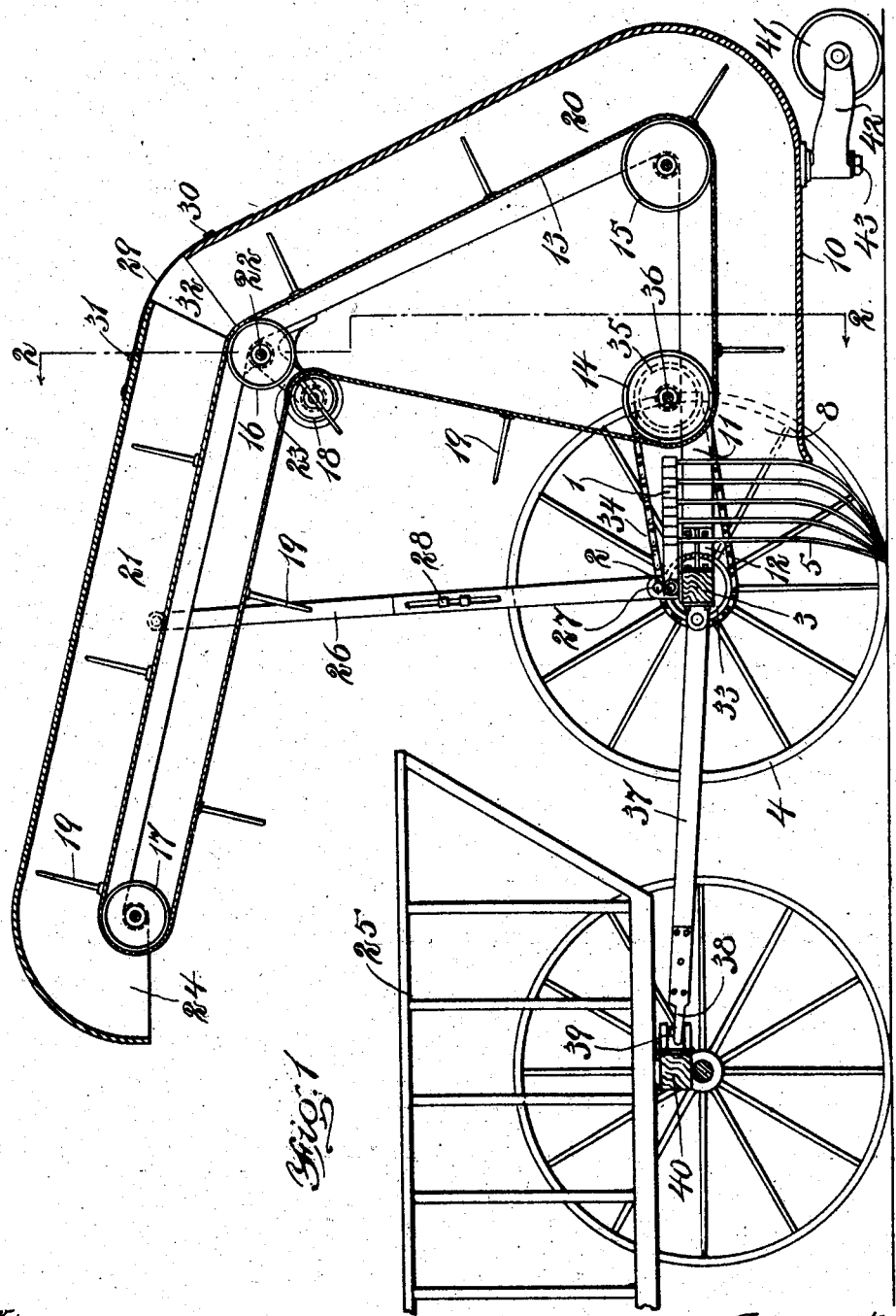
Figure 2:
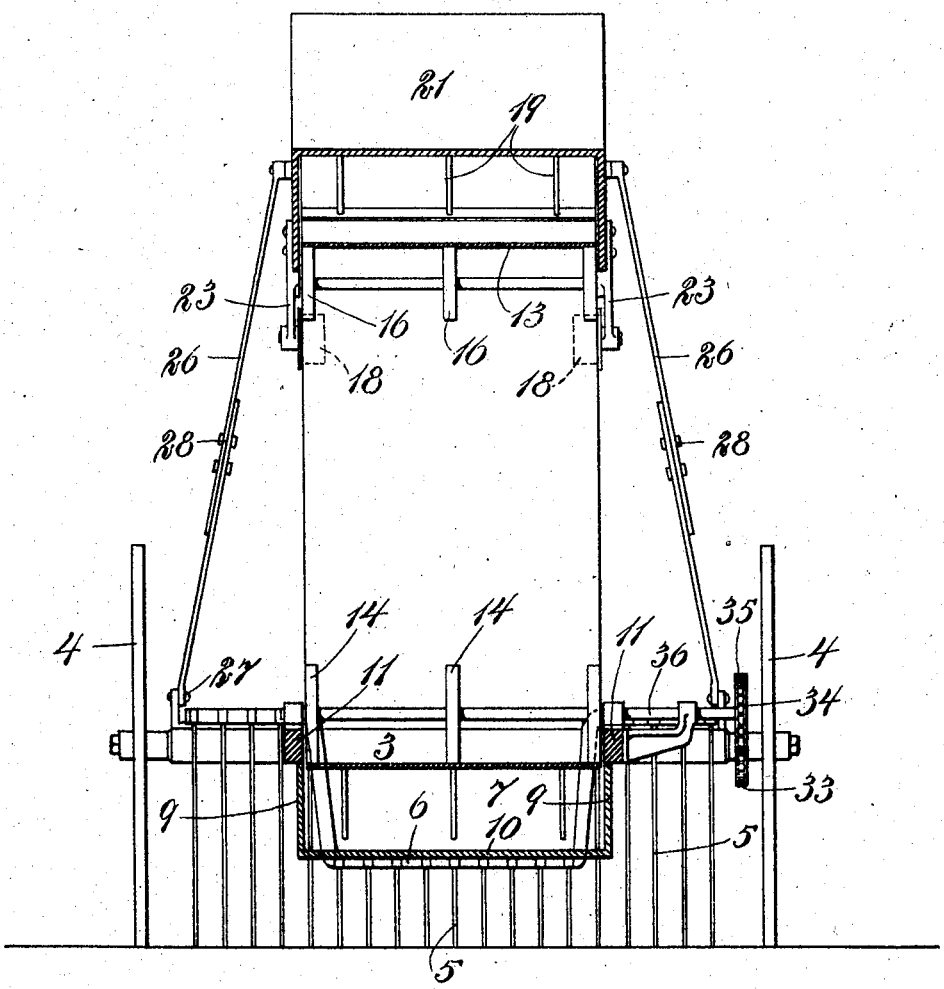

Figure 1 represents in longitudinal section a hay-loader connected to a wagon. Fig. 2 represents a vertical cross-section on line 2 2 of Fig. 1.

The same reference characters indicate the same parts in both figures.

The essential elements of the hay-loader consist of means, such as a rake, for gathering up hay scattered loosely on the ground and conveying means starting adjacent the rake and extending upwardly, having an outlet through which the hay may be discharged into a wagon or whatever other receptacle may be provided.

The rake consists of a bar or frame 1, pivoted at 2 adjacent the ends of an axle 3, supported upon wheels 4. From the rake-bar extend downwardly the teeth or tines 5 of the rake, which at their lower ends are inclined forwardly so as to make a small angle with the ground. The rake-bar 1 is inclined at its ends so that these portions extend from the pivots 2 rearwardly and convergently, while the central part 6 of the bar is offset downwardly or depressed, forming a space 7. The tines of the rake extend from equidistant points of the bar and prevent any of the hay being passed over thereby, while the inclined ends cause the hay as it is gathered to be crowded toward the center and to be crowded through the opening 7, which forms a discharge passage or outlet of the rake. The teeth extending from the depressed portion 6 are slanted far enough forwardly to raise the hay and assist in causing it to pass out through the opening 7.

There is a conduit or passage which has an inlet 8 directly behind the opening 7, through which the contents of the rake are discharged. The conduit has side walls 9 and another wall 10. Adjacent the inlet end is the bottom of the conduit. Adjacent the outlet end is the top, and in the intermediate portion is the rear wall. The conduit is attached to the rake by means of bars 11, extending forwardly from the side walls, which are connected by brackets 12 (preferably so that they can readily be detached) to the axle 3.

A conveyer is provided, which preferably takes the form of an endless flexible belt 13, which extends from one side wall to the other of the conduit and forms the fourth and closing wall thereof. This conveyer passes over driving-pulleys 14 and guide-pulleys 15, 16, 17, and 18 and has projections 19, which project into the mass of hay and enable it to be positively fed along.

The conduit is made in two sections, a lower and rear section 20 and an upper forward section 21, of which the former is rigid with the rake-axle, and the latter section is adjustable, being pivoted to the portion 20 at 22. This pivot is concentric with the axis of the guide-pulley 16 and may be the axle itself, and thereby an adjustment of the section 21 may be altered without altering to any perceptible extent the tension of the conveyer. Another of the guide-pulleys—pulley 18—is journaled in arms 23, which project downwardly and forwardly from the pivot 22, and this pulley is close to the pulley 16. The position of the latter pulley is such as to compensate for and neutralize the tendency toward variation in tension of the belt due to wrapping it more or less around pulley 16.

The adjustable section 21 of the conduit has an outlet 24 above and forward of the rake, which is adapted to lie directly above a portion of a hay-wagon 25, to which the loading device may be attached. The outlet 24 may be raised or lowered by swinging the section 21 about its pivot 22, so as to vary the height of the pile of hay beneath the outlet, and it is held in any adjusted position by braces 26, connected to the section 21 and to the axle 3 at the pivots 27. These braces consist of two members, which overlap somewhat and are slotted to receive bolts 28 for clamping them together. It will be obvious that this construction and arrangement permit lengthening or shortening of the braces 26. The joint between the two sections is covered by a flexible sheet-metal shield 29, which is connected by bolts 30 31 to the two sections. The connection of the plate 29 with either section 20 or 21 may be slotted so as to permit the necessary pivotal movement of the adjustable section. The sides of the opening are also covered by plates 32, the outer edges of which are concentric with the axis 22.

The conveyer-belt 13 is kept in constant movement while the machine is being moved by means of a sprocket-wheel 33, connected to one of the supporting-wheels 4, about which passes a chain 34, which also passes over a second sprocket 35, connected to the shaft 36, which supports the driving-pulley 14. Whenever the loading-machine is moved, the supporting-wheel 4 is rotated, and thereby the conveyer is driven.

The loading attachment may be connected to a wagon by means of a yoke consisting of shafts or bars 37, pivoted to the axle 3 and connected together at their opposite ends, being there provided with a single eye 38, passing around a pin 39, secured to the rear axle 40 of the wagon. This single pivotal connection permits the wagon to turn and the loading attachment to follow after without the shafts being broken or the loader being moved bodily sidewise, and the outlet 24 is arranged approximately vertically above the eye 38, so that it must discharge directly above the wagon in whatever position the loader may be with regard to the wagon. The rear part of the conduit is supported by an idle roller 41, journaled between the arms of a bracket 42, which is swiveled upon a stud 43, connected to the conduit.

When the loading attachment is being drawn behind a wagon, and thereby set in motion, the hay lying upon the ground is gathered by the rake and the conveyer is set in motion. As the hay is gathered it is massed in front of the outlet 7 and crowded therethrough by accumulating masses. This action is assisted by the projections 19, which extend somewhat into the opening 7 and catch and draw therethrough the hay. These projections carry the hay first rearwardly through the lower part of the conduit, then upwardly and forwardly through the intermediate portion, and finally in a generally forward direction through the adjustable section until the hay is discharged from the opening.

The device above described is simple in construction, efficient in operation, and adaptable for a variety of conditions. It is also not limited in its applicability to collecting and gathering hay, but may act also upon grain, corn, and other products having similar properties to those of hay.

I claim—

1. A hay-loader comprising a rake having a central depression forming a discharge-outlet, a conduit extending from said rake-opening upwardly and having an elevated discharge-outlet, and a conveyer arranged to move the hay into and through the conduit.

2. A hay-loader comprising a rake having a central depression forming a discharge-outlet, a conduit extending from said rake-opening upwardly and having an elevated discharge-outlet, a conveyer arranged to move the hay into and through the conduit, and means actuated by motion of the loader for driving the conveyer.

3. A hay-loader comprising a rake having its central portion depressed to form a discharge-outlet, a conduit extending from said rake-opening upwardly and having an elevated discharge-outlet, a traveling conveyer extending throughout the length of the conduit for carrying hay therethrough, and means for actuating said conveyer.

4. A hay-loader comprising a rake having rearwardly and laterally inclined side portions and a depression forming a discharge-opening in its central part, a conduit having an inlet adjacent the opening of the rake and an outlet at a higher elevation, and means for causing the hay to travel through the conduit and to be discharged from the outlet thereof.

5. A hay-loader comprising a rake having rearwardly and laterally inclined side portions and a depression forming a discharge-opening in its central part, a conduit having an inlet adjacent the opening of the rake and an outlet at a higher elevation, a conveyer coextensive with the conduit, and means for actuating said conveyer to carry therethrough and discharge therefrom hay gathered by the rake.

6. A hay-loader comprising a rake having rearwardly and laterally inclined side portions and a discharge-opening in its central part, a conduit having a horizontal rearwardly-extending portion with an inlet adjacent the opening of the rake and an outlet at a higher elevation, a traveling conveyer having projections for engaging the mass of hay extending throughout the length of the conduit, and means for driving the conveyer.

7. A hay-loader comprising means for gathering hay from the ground, a conduit having a number of parts extending respectively rearwardly, upwardly and forwardly therefrom and having an elevated outlet, and a conveyer-belt forming the top side of one part of the conduit and the front and under sides of the other parts thereof being movable to feed the hay.

8. A hay-loading device comprising a rake-bar inclined laterally from its ends toward its central part convergently in a rearward direction and having its central part depressed or offset downward, rake-teeth extending from the bar to, or near, the ground, and a conduit having an intake adjacent the depressed portion of the rake-bar, leading upward therefrom, and having an elevated outlet.

In testimony whereof I have affixed my signature in presence of two witnesses.

WILBERT C. TRUSSELL.

Witnesses:
ARTHUR H. BROWN,
E. BATCHELDER.